United States Patent
Kalagnanam et al.

(10) Patent No.: US 8,418,144 B2
(45) Date of Patent: Apr. 9, 2013

(54) FAST RENDERING OF UNSIGNED APPLET JARS IN A WEB BROWSER ENVIRONMENT

(75) Inventors: Aruna Kalagnanam, Bangalore (IN);
Shuti Kumar, Littleton, MA (US);
Venkat R. Vellaisamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1581 days.

(21) Appl. No.: 11/850,765

(22) Filed: Sep. 6, 2007

(65) Prior Publication Data

US 2009/0070758 A1    Mar. 12, 2009

(51) Int. Cl.
*G06F 9/44* (2006.01)
*G06F 9/45* (2006.01)
*G06F 9/445* (2006.01)

(52) U.S. Cl.
USPC ............ 717/127; 717/148; 717/165; 717/178

(58) Field of Classification Search ................... 717/133, 717/157
See application file for complete search history.

(56) References Cited

U.S. PATENT DOCUMENTS

| | | | |
|---|---|---|---|
| 5,805,829 A | 9/1998 | Cohen et al. | |
| 6,125,402 A | 9/2000 | Nagarajayya et al. | |
| 6,272,674 B1 | 8/2001 | Holiday, Jr. | |
| 6,370,552 B1 | 4/2002 | Bloomfield | |
| 6,636,885 B1 | 10/2003 | Martin | |
| 6,788,315 B1 | 9/2004 | Kekic et al. | |
| 2001/0037356 A1* | 11/2001 | White et al. | 709/201 |
| 2002/0147735 A1* | 10/2002 | Nir | 707/200 |
| 2005/0071810 A1* | 3/2005 | Sutter et al. | 717/116 |

OTHER PUBLICATIONS

Yellin, D. M.;, "Competitive algorithms for the dynamic selection of component implementations," IBM Systems Journal, vol. 42, No. 1, pp. 85-97, 2003, doi: 10.1147/sj.421.0085.*

* cited by examiner

*Primary Examiner* — James D Rutten
(74) *Attorney, Agent, or Firm* — David A. Dagg (57) ABSTRACT

A system for fast rendering of an applet in a Web browser environment. A server process pre-determines the order in which the applet classes are loaded by the applet. The server process determines the classes of the applet that are required for applet start-up, and these startup classes are bundled into an initial JAR file on the server for the applet, along with a list of other class files belonging to the original JAR files. After the initial JAR file is downloaded, and while the JVM on the client system is loading the applet classes from the initial JAR file to bring up the applet, the rest of the applet classes (i.e. non-startup classes) are downloaded from the server to the client in the background. As each such non-startup class is received by the client system, it is loaded into the correct JAR file based on the class list.

15 Claims, 4 Drawing Sheets

FAST RENDERING OF UNSIGNED APPLET JARS IN A WEB BROWSER ENVIRONMENT

FIELD OF THE INVENTION

The disclosed system relates generally to providing applications from a server computer system to a client computer system, and more specifically to a method and system for fast rendering of unsigned applet JARs (Java ARchives) in a Web browser environment.

BACKGROUND OF THE INVENTION

As it is generally known, Java programs that are run from a Web browser are known as "applets". Applets are executed in the Web browser environment using Java plug-in technology. Applets consist of Java executable files that are transferred from a server system and executed within the Web browser on a client machine. In existing systems, the executable files for an applet are Java class files (i.e. files having a *class extension and storing Java byte code) that are bundled into one or more JAR (Java ARchive) files.

When executing an applet for the first time, the plug-in on the client system downloads the applet's JAR files from the server system into its local cache directory, and then renders the applet in the Web browser window of the graphical user interface. A significant drawback in existing systems is the time delay between downloading the applet's JAR files and rendering of the applet. For example, in the context of a typical data communication network, for a JAR file of size of approximately 2 Megabytes, such time delays may approach 5-6 seconds. Delays of this extent are frustrating and time consuming for the user.

Attempts have previously been made to address this problem, but have fallen significantly short in terms of providing an effective solution. One previous approach existing in the Java Plug-in code base from Sun Microsystems provides that the whole JAR file is downloaded before the applet is made visible to the user. The main drawback of this type of approach is still the delay in applet start-up, again resulting in an undesirable delay experienced by the user.

Existing Java Plug-in technology also includes the option of using what is generally known as "lazy" downloading of JAR files. However, in existing systems, the lazy JAR downloading is still performed by downloading a complete JAR file at the time that at least a portion of it is required. Even with such existing "lazy" approaches, the requirement that the whole JAR file be downloaded in its entirety causes significant time delays for the user.

In U.S. Pat. No. 6,636,885, a solution is proposed for delaying the loading of classes that are un-necessary for applet start-up by using interface stubs for the delayed classes. This approach has several shortcomings:

- Only single JAR file applets are discussed, and the multiple JAR applet scenario is not dealt with at all.
- The delayed classes are downloaded over the network whenever they are referenced. Most applets are interactive, which means that the classes will be downloaded whenever the user actions reference them; as a result there again may still be a freeze or delay requiring the user to wait at applet run-time.
- The system presents the user with a false sense of security that the applet is fully up and running, when the delayed classes have actually not been downloaded.
- The system has no ability to automatically determine the startup classes for the applet.

For the above reasons and others, it would be desirable to have a new system for fast rendering of unsigned applet JARs (Java Archives) in a Web browser environment that addresses these problems.

SUMMARY OF THE INVENTION

To address the above described and other shortcomings of previous systems, a new method and system for fast rendering of unsigned applet JARs (Java Archives) in a Web browser environment is disclosed. As mentioned above, each applet JAR file consists of various class files having a .class extension and storing Java bytecode. However, during applet startup, all classes need not be made immediately available for the Plug-in on the client system. As in previous systems, at applet launch time, on the client system, the Java Plug-in Framework (JPF) invokes a Java Virtual Machine (JVM) to execute the applet class files. Additionally, the disclosed system can advantageously use the above described lazy class loading option of the JVM that delays making classes available until the point in time when they are actually used in the applet.

In the disclosed system, a process on the server system from which the applet is downloaded pre-determines an order in which the applet classes are downloaded from the server system to the client system. The server process first determines the classes of the applet that are required for applet start-up (i.e. startup classes), and these startup classes are bundled into an initial JAR file on the server system. A list of start-up and non-startup class files for the applet is also generated by the server process. This "class list" indicates the relationships between startup and non-startup class files and their original JAR files.

Advantageously, the applet's initial JAR file, as calculated by the server process of the disclosed system, is relatively small in size. As a result, when the applet is subsequently downloaded to the client system, the download time for the initial JAR file is relatively short. After the initial JAR file is downloaded, and while the JVM on the client system is loading the applet classes from the initial JAR file to bring up the applet in its initial state, the rest of the applet classes (i.e. non-startup classes) are individually downloaded from the server system to the client system, for example by way of a lower priority background process that does not interfere with the initial rendering of the applet. The order in which non-startup classes are sent from the server system to the client system may be determined in the server system based on 1) an ordering of the original JAR files in which the classes were contained when the applet was deployed on the server, e.g. as indicated in a PARAM tag or the like associated with the applet (i.e. contained in the Web page referencing the applet), or 2) the order of classes needed to render the applet beyond its initial state, as determined by running one or more use cases on the server system (e.g. using an applet viewer program or the like). The non-startup classes received by the client system from the server system are loaded into the client cache memory, and these remaining classes are also bundled into JARs on the client side. When a class is required by the Java Plug-in, then the JVM will load that class from the JAR directly into its memory without having to write it to a disk. Thus the non-startup classes are individually conveyed from the server system to the client system in an order that reflects the likelihood that they will be used, which makes it easier for the JVM to lookup a particular class inside the JAR. It is also not necessary for a JAR to be fully received at the client side before classes can be loaded from it. Hence, if a particular class is required from a JAR file before the complete archive has been received, the Java Plug-in class loader will still be able to load the class from the incomplete archives In an alternative embodiment, the non-startup classes are sent from the server to the client system in the original JARs of the applet, after the initial JAR is sent. In such an alternative embodiment, the original JARs of the applet have been pre-processed at the server system to construct the initial JAR, and accordingly may, if permitted by the security context, contain only the non-startup classes of the applet.

In an embodiment in which non-startup class files are sent individually from the server to the client system, after each non-startup class is received by the client system, it is loaded back into its original JAR file at the client system based on the class list contained in the initial JAR file. Similarly, start-up classes sent from the server to the client system in the initial JAR may also be moved in the background from the initial JAR file into their original JAR files on the client system in the background, e.g. after they are used to bring up the applet. In this way, the applet's original JAR files may be reconstructed on the client system without interfering with the start-up of the applet on the client system using the startup classes conveyed from the server system to the client system in the initial startup file.

The disclosed system provides significant advantages over previous systems. First, unlike the approach of U.S. Pat. No. 6,636,885, the disclosed system addresses both single and multiple JAR applets. In the case of an applet having multiple JAR files, the initial JAR file calculated by the disclosed system on the server system may include startup classes from different JAR files, and the class list ( e.g. "classes.list") provides a mapping of each applet class to its corresponding original JAR file.

The disclosed system incurs no freeze or waiting while non-startup classes are downloaded. As the JVM is loading the start-up classes from the initial JAR of the applet, other classes are downloaded in the background, and updated into their corresponding JAR files. In the event that user interactions require a class that is yet to be downloaded, the client side Plug-in mechanism handles the situation by invoking the Network class loader to download required class on a prioritized basis, and then updates the downloaded class its corresponding JAR file.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
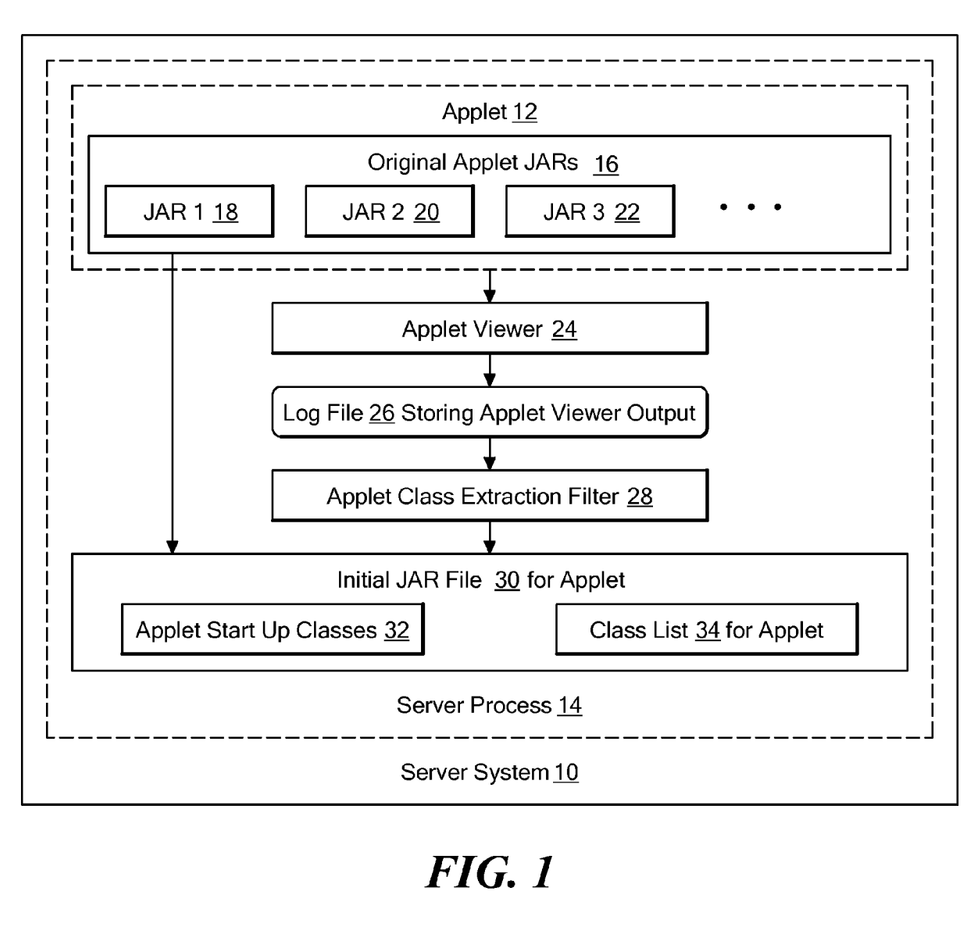
FIG. 1 is a block diagram showing software and/or hardware components in an illustrative embodiment of a server system in the disclosed system.

FIG. 1 is a block diagram showing software and/or hardware components in an illustrative embodiment of a server system in the disclosed system. As shown in FIG. 1, a Server System 10 includes a Server Process 14. The Server Process 14 operates in response to receipt of an Applet 12 (e.g. upon deployment of the Applet 12 on the Server System 10), shown including a number of Original Applet JARs 16 (e.g. JAR 1 18, JAR 2 20, JAR 3 22, etc.), by invoking an Applet Viewer 24 on the Applet 12. The Original Applet JARs 16 each include one or more Java class files (i.e. executable files having .class extensions and containing Java byte codes, also referred to herein as "classes") that are part of the Applet 12. The Applet Viewer 24 is invoked (e.g. with the runtime flag '-verbose:class') on the contents of the Applet 12 to generate an initial view of the Applet 12, e.g. rendering a starting page for the Applet 12. In the illustrative embodiment of FIG. 1, the Server Process 14 captures the output of the Applet Viewer 24 invoked on the Applet 12 in a Log File 26 stored on the Server System 14.

As further as shown in FIG. 1, the Server Process 14 operates by applying an Applet Class Extraction Filter 28 to the Log File 26 to identify and extract Java classes needed to generate the initial view of the Applet 12, referred herein for purposes of explanation as the "start-up classes" for Applet 12.

The Server Process 14 further operates to generate an Initial JAR file 30 for the Applet 12. The Server Process 14 removes the classes identified by the Applet Class Extraction Filter 28 as start-up classes for the Applet 12 from the Original Applet JARs 16, and moves them into the Applet Start-Up Classes 32 contained in the Initial JAR 30.

In addition, the Server Process 14 operates to generate a Class List 34 for Applet 12. The Class List 34 is a list of entries where each list entry associates one of the classes contained in the Original Applet JARs 16 for Applet 12 with the specific one of the Original Applet JARs 16 in which that applet class was originally contained. Accordingly, the Class List 34 describes the specific JAR within the JARs 16 from which each start-up class moved into the Applet Start-Up Classes 32 was obtained, and also the specific JAR within the JARs 16 in which each non-startup class for Applet 12 continues to be stored after removal of the start-up classes from the JARs 16.

Figure 2:
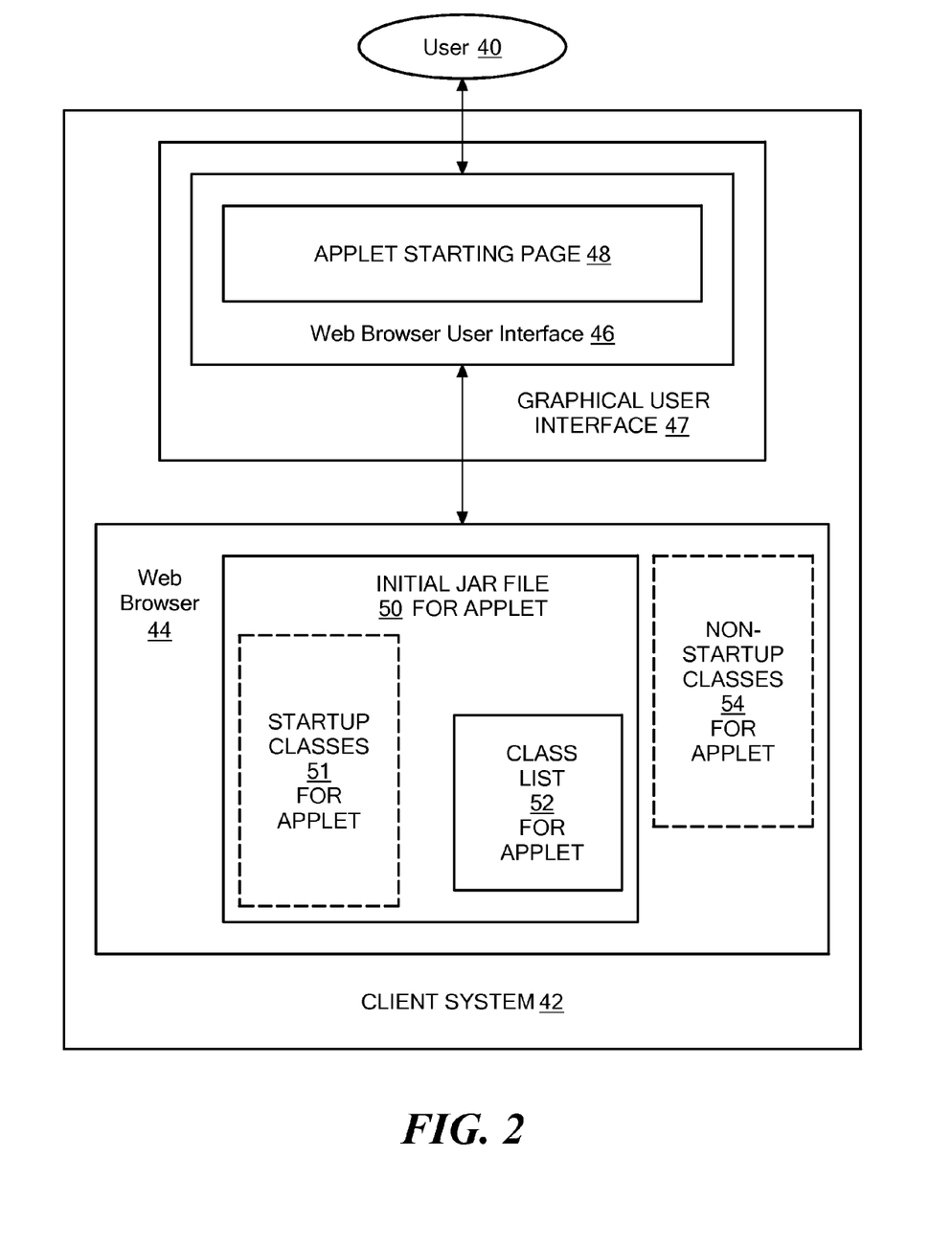
FIG. 2 is a block diagram showing software and/or hardware components in an illustrative embodiment of a client system in the disclosed system.

FIG. 2 is a block diagram showing software and/or hardware components in an illustrative embodiment of a client system in the disclosed system. As shown in FIG. 2, a Client System 42 includes a Web Browser 44 that generates a Web Browser User Interface 46 within a Graphical User Interface 47 for a User 40. During operation of the embodiment shown in FIG. 2, when an applet (e.g. Applet 12 of FIG. 1) is to be downloaded to the Client System 42 from a remote server system (e.g. Server System 10 of FIG. 1), for example as a result of a user action by the User 40 in the Graphical User Interface 47, such as launching an Web page having the applet embedded within it (e.g. through an Applet tag or the like), the Initial JAR File 50 for the applet is first downloaded from the remote server system. The Initial JAR File 50 corresponds to the Initial JAR File 30 shown in FIG. 1, and includes Start-up Classes 51 for the applet being downloaded, and Class List 52 for the applet being downloaded.

After the Initial JAR file 50 has been received by the Client System 42, the Web Browser 44 uses the Start-up Classes 51 to generate an initial view of the applet, e.g. to display the Applet Starting Page 48. While the Web Browser 44 is generating the initial view of the applet using the Start-up Classes 51, the Non-Startup Classes 54 for the applet are downloaded in parallel to the Client System 42 from the remote server system in the background (e.g. at a relatively lower priority). In the disclosed system, each class in the Non-Startup Classes 54 is individually pushed to the Client System 42 from the remote server system. The order in which the Non-Startup Classes 54 are conveyed from the remote server system to the client system is pre-determined by the server system. For example, in a first embodiment, the order in which the Non-Startup Classes 54 are pushed to the client system is determined based on an order of the original JARs in which the classes within the Non-Startup Classes 54 were contained. In such an embodiment, the ordering of original JARs may be determined from a PARAM tag or the like, such as is typically contained within the Web page referencing the applet being downloaded. The value of the PARAM tag indicates an order of the original JAR files for the applet that can be used to send groups of individual non-startup classes from the remote server system to the Non-Startup Classes 54 in Client System 42. For example, if the applet being downloaded was made up of two original JAR files demo.jar and fred.jar, and the Web page referencing the applet included the following PARAM tag expression:

<PARAM NAME="archive" VALUE="demo.jar,fred.jar"> then the non-startup classes originally stored in demo.jar are pushed from the remote server system to the Non-Startup Classes 54 before the non-startup classes originally stored in fred.jar.

In an alternative embodiment, the order in which individual non-startup classes are pushed from the remote server system into the Non-Startup Classes 54 is determined by running one or more use case scenarios on the applet in the remote server system. Such use case scenarios may, for example, reflect actual previous uses of the applet on the Client System 42 that were monitored by or otherwise described to the remote server system prior to the current downloading of the applet. Alternatively, such use cases may be provided to the remote server system by a developer or distributor of the applet, e.g. when the applet is deployed on the remote server system.

The Client System 42 of FIG. 1 may be any specific type of a computer system or intelligent electronic device, such as a desktop, laptop, or palmtop computer system, or a personal digital assistant, cell phone, or other electronic device. The Client System 42 of FIG. 1 may include or control a display device capable of displaying a graphical user interface (e.g. the Graphical User Interface 47) to a local user (e.g. User 40), such as a liquid crystal display (LCD), cathode ray tube (CRT), interferometric modulator display (IMOD), light emitting diode (LED), or the like.

Those skilled in the art will recognize that the Web Browser 42 of FIG. 2 and Server Process 14 of FIG. 1 may be embodied using software or firmware, such as computer application program code, operating system program code, middleware, and/or wholly or partly using digital hardware components, such as application specific integrated circuits (ASICs), field-programmable gate arrays (FPGAs), and the like, and/or combinations of hardware and/or software or firmware. Those skilled in the art will further recognize that the Client System 42 of FIG. 2 and Server System 10 of FIG. 1 may include one or more processors, and program storage, such as memory, for storing program code executable on such processors, as well as input/output devices and/or interfaces. In the example of FIGS. 1 and 2, the Client System 42 and Server System 10 are interconnected through a computer or data communication network (e.g. the Internet, a Local Area Network, etc.) through one or more of such input/output devices or interfaces, and through which may further be provided communication to a number of other client systems and/or other server systems.

Figure 3:
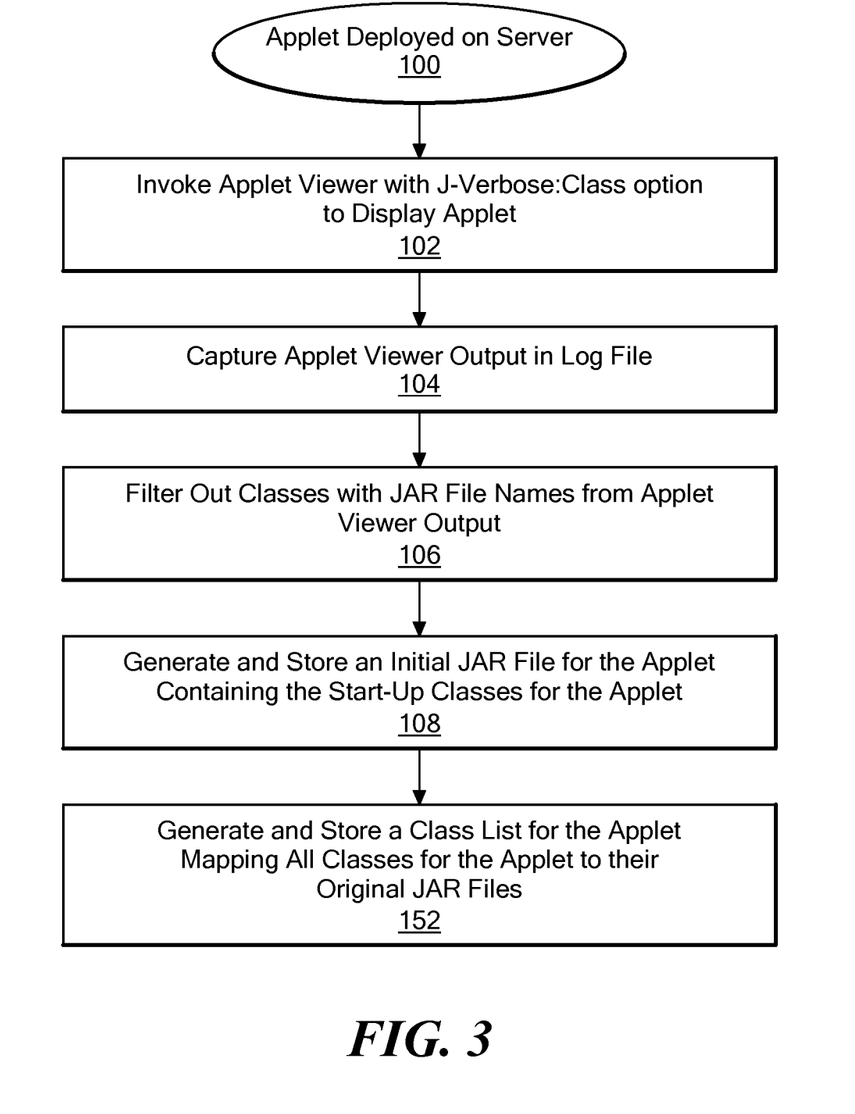
FIG. 3 is a flow chart showing steps performed during operation of an illustrative embodiment to generate an initial archive for an applet in an illustrative embodiment.

FIG. 3 is a flow chart showing steps performed during operation of an illustrative embodiment of the disclosed system to generate an initial archive for an applet in an illustrative embodiment. In response to a trigger event, shown for purposes of illustration in FIG. 3 as the applet being deployed on a server system, a process on the server system invokes an applet viewer (e.g. with the -verbose:class option) on the applet within the server system, in order to generate an initial view of the applet as would be seen in a graphical user interface on the client system. The output of the applet viewer invoked in this regard is captured into a log file on the server system in step 104, and at step 106 the contents of the log file is filtered to find the classes with JAR file names in the applet viewer output. The filtering performed at step 106 may, for example, be performed using a "grep" command line utility or the like. As it is generally known, the "grep" utility was originally written for use with the Unix operating system, and can be used to search for lines of text that match one or many regular expressions, outputting only the matching lines.

Further based on the filtering performed in step 106, at step 108 the disclosed system generates and stores an initial JAR file for the applet, where the initial JAR file contains all the classes for the applet that are needed to generate the initial view of the applet in the graphical user interface (i.e. the "start-up" classes for the applet). Such start-up classes for the applet are moved from their original JAR files into the initial JAR file. Finally, at step 110, the disclosed system operates to generate and store a class list for the applet, where the class list maps all classes of the applet to the original JAR files in which they were stored, prior to the startup classes being moved from the original JAR files into the initial JAR file for the applet.

Step 110 may further include determining an order in which non-startup class files for the applet are to be downloaded to the client system when the applet is launched, for example based on a JAR order indicated by a PARAM tag in the Web page referencing the applet, and/or based on one or more use cases applied to the applet on the server system prior to downloading the applet to the client system, for example using the applet viewer in the server system.

Figure 4:
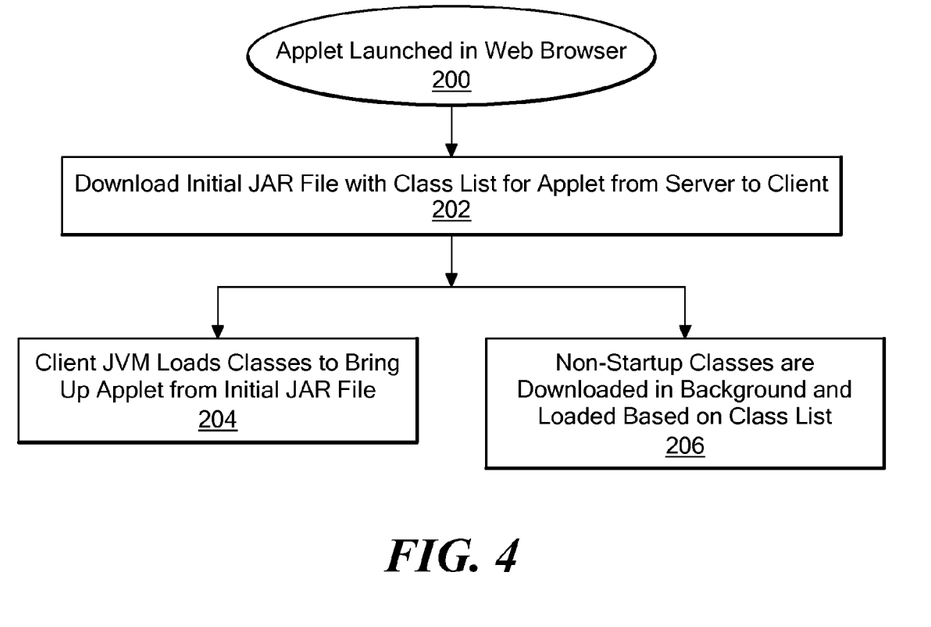
FIG. 4 is a flow chart showing steps performed during operation of an illustrative embodiment to download an applet from a server system to a client system in an illustrative embodiment.

FIG. 4 is a flow chart showing steps performed during operation of an illustrative embodiment to download an applet from a server system to a client system in an illustrative embodiment. As shown in FIG. 4, a trigger event is detected at step 200, shown for purposes of illustration as an applet being launched in a Web browser. In response to the trigger event 200, at step 202 the pre-calculated initial JAR file for the applet is located on a remote server system and downloaded to the client system on which the applet is being launched. Further at step 202, a class list mapping all classes in the applet to their original JAR files is also downloaded from the remote server system to the client system.

Following step 202, steps 204 and 206 are performed in parallel. Step 206 may, for example, be performed at a lower priority than step 204 (e.g. in the background). In step 204, the client system Java Virtual Machine (JVM) loads the start-up classes from the initial JAR file into memory to bring up the applet. In step 206, the non-startup classes (those applet classes not contained in the initial JAR file received at step 202) are individually pushed from the server system in an order that is predetermined by the server system. The non-startup classes of the applet are individually received directly into cache memory on the client system.

In an alternative embodiment, the non-startup classes are sent from the server system to the client system at step 206 in the original JARs of the applet, after the initial JAR is sent. In such an alternative embodiment, the original JARs of the applet have been pre-processed at the server system to construct the initial JAR, and accordingly the original JARs sent from the client system to the client system contain only the non-startup classes of the applet.

Further on the client system in step 206 (i.e. in a background process), the original JAR files of the applet may be reconstructed in the client system memory. Such reconstruction of the original JAR files of the applet is based on the contents of the class list downloaded from the server system at step 202. Thus the class list provided by the remote server system enables the applet classes from both the initial JAR file of the applet, as well as the non-startup classes pushed to the client system after the initial JAR file, to be put back into their original JAR files without interfering with the bringing up of the applet in step 204 (e.g. displaying of the initial page of the applet).

A key advantage of the disclosed system is that only a minimum set of classes (the start-up classes) are required to be contained in the initial JAR file that is first sent from the remote server system to the client system when client connects to the server system to download the applet when the applet is launched on the client. The size of the initial JAR file is relatively small, since the set of start-up classes need to initially display the applet in the user interface is also small. After this relatively small initial archive has been downloaded, the remainder of the classes (the non-startup classes) are downloaded in the background (e.g. on the same HTTP connection) and then updated into their original JAR files (e.g. using a Plug-in mechanism on the client).

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for fast rendering of unsigned applet archives in a Web browser environment, comprising:

detecting, by a server process on a server system, a first trigger event;

determining, by said server process responsive to said first trigger event, a loading order of classes for an applet, wherein said determining said loading order comprises running a viewer process on said applet in said server system to generate an initial view of said applet as would be seen in a graphical user interface on a client system and capturing output of said viewer process into a log file on said server system;

identifying, by said server process responsive to said loading order of classes for said applet, a set of start-up classes for said applet, wherein said start-up classes are required to initially launch said applet;

generating, by said server process, an initial archive file for said applet, wherein said initial archive file contains said set of start-up classes for said applet, wherein said generating said initial archive file for said applet further comprises removing said set of start-up classes from at least one original archive file associated with said applet and storing said set of start-up classes in said initial archive file for said applet;

generating, by said server process, a class list for said applet, wherein said class list indicates an original archive file for each class of said applet;

detecting a second trigger event;

downloading, from said server system to said client system responsive to said second trigger event, said initial archive file and said class list;

bringing up said applet on said client system using said initial archive file;

in parallel with said bringing up said applet on said client system using said initial archive file, downloading classes of said applet other than said set of start-up classes for said applet from said server system to said client system by downloading said classes of said applet other than said set of start-up classes within said original archive file, said original archive file having said set of start-up classes removed therefrom; and reconstructing said original archive file on said client system by loading said start-up classes back into said original archive file responsive to said class list.

2. The method of claim 1, wherein said first trigger event comprises deployment of said applet on said server system.

3. The method of claim 2, wherein said second trigger event comprises a user of said client system launching a Web page including an embedded reference to said applet.

4. The method of claim 1, wherein said identifying said set of start-up classes for said applet comprises:

filtering said log file to identify classes of said applet needed to generate said initial view of said applet.

5. The method of claim 4, wherein said determining said loading order of said classes for said applet further comprises:

determining an order in which said classes other than said set of start-up classes for said applet are to be downloaded from said server system to said client system.

6. The method of claim 5, wherein said determining said order in which said classes other than said set of start-up classes for said applet are to be downloaded from said server system to said client system is responsive to at least one use case associated with said applet, wherein said use case is applied to said applet using said viewer process on said server system, and wherein an output of applying said use case to said applet through said viewer process indicates said order in which said classes other than said set of start-up classes for said applet are to be downloaded from said server system to said client system.

7. The method of claim 5, wherein said determining said order in which said classes other than said set of start-up classes for said applet are to be downloaded from said server system to said client system is responsive to an archive order specified by at least one tag contained in said Web page including said embedded reference to said applet.

8. A system including at least one processor and a computer readable memory for storing program code executable on said processor, said program code including program code for fast rendering of unsigned applet archives in a Web browser environment, said program code comprising:
 program code for detecting, by a server process on a server system, a first trigger event;
 program code for determining, by said server process responsive to said first trigger event, a loading order of classes for an applet, wherein said determining said loading order comprises running a viewer process on said applet in said server system to generate an initial view of said applet as would be seen in a graphical user interface on a client system and capturing output of said viewer process into a log file on said server system;
 program code for identifying, by said server process responsive to said loading order of classes for said applet, a set of start-up classes for said applet, wherein said start-up classes are required to initially launch said applet;
 program code for generating, by said server process, an initial archive file for said applet, wherein said initial archive file contains said set of start-up classes for said applet, wherein said generating said initial archive file for said applet further comprises removing said set of start-up classes from at least one original archive file associated with said applet and storing said set of start-up classes in said initial archive file for said applet;
 program code for generating, by said server process, a class list for said applet, wherein said class list indicates an original archive file for each class of said applet;
 program code for detecting a second trigger event;
 program code for downloading, from said server system to said client system responsive to said second trigger event, said initial archive file and said class list;
 program code for bringing up said applet on said client system using said initial archive file; and
 program code for, in parallel with said bringing up said applet on said client system using said initial archive file, downloading classes of said applet other than said set of start-up classes for said applet from said server system to said client system by downloading said classes of said applet other than said set of start-up classes within said original archive file, said original archive file having said set of start-up classes removed therefrom; and
 program code for reconstructing said original archive file on said client system by loading said start-up classes back into said original archive file responsive to said class list.

9. The system of claim 8, wherein said first trigger event comprises deployment of said applet on said server system.

10. The system of claim 9, wherein said second trigger event comprises a user of said client system launching a Web page including an embedded reference to said applet.

11. The system of claim 8, wherein said program code for identifying said set of start-up classes for said applet further comprises:
 program code for filtering said log file to identify classes of said applet needed to generate said initial view of said applet.

12. The system of claim 11, wherein said program code for determining said loading order of said classes for said applet further comprises:
 program code for determining an order in which said classes other than said set of start-up classes for said applet are to be downloaded from said server system to said client system.

13. The system of claim 12, wherein said program code for determining said order in which said classes other than said set of start-up classes for said applet are to be downloaded from said server system to said client system is responsive to at least one use case associated with said applet, wherein said use case is applied to said applet using said viewer process on said server system, and wherein an output of applying said use case to said applet through said viewer process indicates said order in which said classes other than said set of start-up classes for said applet are to be downloaded from said server system to said client system.

14. The system of claim 12, wherein said program code for determining said order in which said classes other than said set of start-up classes for said applet are to be downloaded from said server system to said client system is responsive to an archive order specified by at least one tag contained in said Web page including said embedded reference to said applet.

15. A computer program product including a non-transitory computer readable medium, said computer readable medium having program code stored thereon for fast rendering of unsigned applet archives in a Web browser environment, said program code comprising:
 program code for detecting, by a server process on a server system, a first trigger event;
 program code for determining, by said server process responsive to said first trigger event, a loading order of classes for an applet, wherein said determining said loading order comprises running a viewer process on said applet in said server system to generate an initial view of said applet as would be seen in a graphical user interface on a client system and capturing output of said viewer process into a log file on said server system;
 program code for identifying, by said server process responsive to said loading order of classes for said applet, a set of start-up classes for said applet, wherein said start-up classes are required to initially launch said applet;
 program code for generating, by said server process, an initial archive file for said applet, wherein said initial archive file contains said set of start-up classes for said applet, wherein said generating said initial archive file for said applet further comprises removing said set of start-up classes from at least one original archive file associated with said applet and storing said set of start-up classes in said initial archive file for said applet;
 program code for generating, by said server process, a class list for said applet, wherein said class list indicates an original archive file for each class of said applet;

program code for detecting a second trigger event;

program code for downloading, from said server system to said client system responsive to said second trigger event, said initial archive file and said class list;

program code for bringing up said applet on said client system using said initial archive file; and program code for, in parallel with said bringing up said applet on said client system using said initial archive file, downloading classes of said applet other than said set of start-up classes for said applet from said server system to said client system by downloading said classes of said applet other than said set of start-up classes within said original archive file, said original archive file having said set of start-up classes removed therefrom; and program code for reconstructing said original archive file on said client system by loading said start-up classes back into said original archive file responsive to said class list.

\* \* \* \* \*

UNITED STATES PATENT AND TRADEMARK OFFICE
CERTIFICATE OF CORRECTION

| | | |
|---|---|---|
| PATENT NO. | : 8,418,144 B2 | Page 1 of 1 |
| APPLICATION NO. | : 11/850765 | |
| DATED | : April 9, 2013 | |
| INVENTOR(S) | : Kalagnanam et al. | |

It is certified that error appears in the above-identified patent and that said Letters Patent is hereby corrected as shown below:

On the Title page, item (75), in the list of inventors, the inventor name "Shuti Kumar" should read "Shruti Kumar".

Signed and Sealed this
Twenty-sixth Day of November, 2013

Margaret A. Focarino
*Commissioner for Patents of the United States Patent and Trademark Office*